(12) United States Patent
Lvovsky et al.

(10) Patent No.: US 9,535,713 B2
(45) Date of Patent: Jan. 3, 2017

(54) MANIPULATING RULES FOR ADDING NEW DEVICES

(71) Applicant: Red Hat Israel, Ltd., Raanana (IL)

(72) Inventors: Igor Lvovsky, Raanana (IL); Eduardo Warszawski, Kfar Saba (IL)

(73) Assignee: Red Hat Israel, Ltd., Raanana, IL (US)

( * ) Notice: Subject to any disclaimer, the term of this patent is extended or adjusted under 35 U.S.C. 154(b) by 651 days.

(21) Appl. No.: 13/725,325

(22) Filed: Dec. 21, 2012

(65) Prior Publication Data

US 2014/0181502 A1    Jun. 26, 2014

(51) Int. Cl.
 *G06F 9/44* (2006.01)
(52) U.S. Cl.
 CPC .................... *G06F 9/4411* (2013.01)
(58) Field of Classification Search
 None
 See application file for complete search history.

(56) References Cited

U.S. PATENT DOCUMENTS 6,970,949 B2\* 11/2005 Inui ........................ H04L 41/022
                                                              710/10
2013/0179561 A1\* 7/2013 Tripathi et al. ............... 709/224

\* cited by examiner

*Primary Examiner* — Zachary K Huson
*Assistant Examiner* — Dayton Lewis-Taylor
(74) *Attorney, Agent, or Firm* — Lowenstein Sandler LLP (57) ABSTRACT

An exemplary system may allow new devices to be added. In one embodiment, upon receiving information associated with a device event, the system generates a first rule for a device based on the information and a system state. The system determines determine an updated system state based on the first rule. The system determines whether a second rule is required for the updated system state. Upon determining that the second rule is required for the updated system state, the system generates the second rule.

15 Claims, 4 Drawing Sheets

MANIPULATING RULES FOR ADDING NEW DEVICES

TECHNICAL FIELD

Embodiments of the present disclosure relate to adding new devices to a computing system, and more particularly, to a technique for dynamically manipulating rules for adding new devices.

BACKGROUND

Most modern computing systems allow users to add one or more devices. The devices added can be physical hardware devices, such as storage media, or virtual devices, such as virtual storage media for a virtual machine. However, the rules for adding devices can be very strict.

When a device is connected to the computing system, an interrupt is injected into the computing system and the computing system can determine a type of the device. The computing system can determine whether one or more general rules exist on the computing system for that type of device. The general rule can include information about one or more actions for the computing system to perform when a device of the corresponding type is added. If a general rule for the type of device exists on the computing system, the device can be successfully added to the system and the general rule for the type of device can be applied to the device. If a general rule for the type of device does not exist on the computing system or if the type of device is unknown, the device may not be added to the system and an error message can be generated. For example, if storage disk A is added to a computing system, a determination is made of whether a rule for storage disks exists on the computing system. If a general rule for storage disks exists on the computing system, storage disk A is added to the computing system and the general rule for storage disks is applied. If a general rule for storage disks does not exist on the computing system, storage disk A is not added to the computing system.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the disclosure are directed to a method and system for dynamically manipulating rules for adding new devices.

When a device event occurs on a computing system, a rule for a device that caused the device event can be generated based on information associated with the device event and a state of the computing system. The device can be a physical device, such as a physical hardware disk, or a virtual device, such as a virtual disk. The information associated with the device event can include information about the device that caused the device event. The device can be currently connected to the computing system or can be connected to the computing system at some point in the future. The rule generated for the device is not a general rule for all devices of the same type as the device, but is a specific rule that is generated for the device based on the current state of the computing system. Therefore, if the device is disconnected and another device of the same type is connected, the rule may not be applicable to the other device. Moreover, if the state of the computing system changes, the rule may no longer be applicable.

The state of the computing system can be updated based on the rule or a result of the application of the rule for the device. Based on the updated state of the computing system, one or more additional rules may be generated for the device. Therefore, multiple rules can be applied, either sequentially or simultaneously, when the device is connected to the computing system.

The rules for a device are dynamically generated and are specific to the device that caused a device event. Moreover, the rules for the device are based on a specific state of the computing system in which the device event was triggered. Therefore, even if no rule exists for the type of the device that caused the device event when the device is connected, the device can still be added to the computing system and the computing system can know the actions to perform when the device is added. Furthermore, the computing system can generate the rule whether or not the device is connected to the computing system because the computing system only needs to know that the device may be connected to the computing system at a later point in time. In addition, the process of generating rules for adding a new device can be iterative, such that multiple rules can be generated for adding the device.

Figure 1:
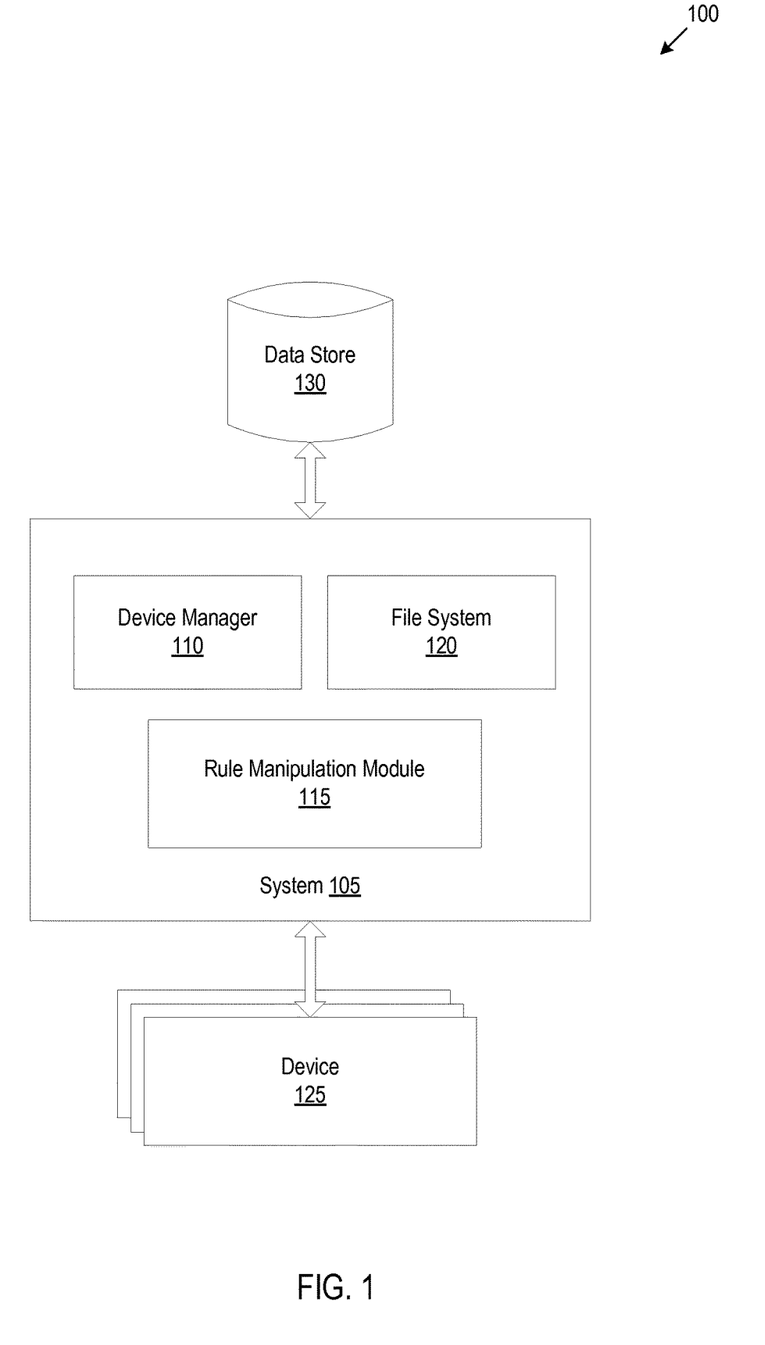
FIG. 1 illustrates exemplary system architecture, in accordance with various embodiments of the present disclosure.

FIG. 1 illustrates an exemplary system architecture 100 in which embodiments can be implemented. The system architecture 100 includes a system 105, one or more devices 125, and a data store 130. The system 105, the one or more devices 125, and the data store 130 can communicate directly or can communicate and be connected by a network (not shown).

System 105 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

Device 125 can include one or more devices that can be associated with a system. The device 125 can be any device that can be connected to a system and that can be used by the system 105. The device 125 can be a physical hardware device, such as a physical disk, a physical network controller, a physical network card, etc. The device 125 can be a virtual device, such as a virtual disk, a virtual network controller, a virtual network card, etc. The system 105 can include multiple devices 125, which can be of different types. For example, the system 105 can include physical devices, such as a physical disk and a physical network card, as well as virtual devices, such as a virtual disk and a virtual network card. For example, if the system 105 is part of a virtual machine host that includes a hypervisor and one or more virtual machines, each virtual machine can have one or more of the above virtual devices.

Data store 130 can include one or more writable persistent storage devices, such as memories, tapes or disks. In one embodiment, the one or more writable persistent storage devices included in data store 130 are non-Random Access Memory (RAM) devices. Although each of system 105 and data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the data store 130 can include data related to the system 105. Examples of data related to the system 105 can include, and are not limited to, a state of the system 105, rules to apply to devices connected to the system 105, and any other electronically stored information that can be associated with a system, etc.

During operation of the system architecture 100, the system 105 can receive information associated with a device event. In one embodiment, the system 105 receives the information associated with the device event from the device 125 that caused the device event to occur. In an alternate embodiment, the system 105 receives the information associated with a device event from a user. In another embodiment, the system 105 receives the information associated with the device event from a client (not shown). The information associated with the device event can include identifying information about a device 125 that was connected to the system 105 or a device 125 that will be connected to the system 105 in the future. In one embodiment, the system 105 can include a device manager 110, a rule manipulation module 115, and a file system 120.

The device manager 110 can be a device manager for the system 105 that can provide information about all devices, such as devices 125, which are currently connected to the system 105. Moreover, the device manager 110 can perform one or more actions when devices, such as devices 125, are added or removed from the system 105. The actions performed by the device manager 110 when devices are added or removed from the system 105 can be based on one or more rules stored in data store 130. The rules can be generated by the rule manipulation module 115.

In one embodiment, the rule manipulation module 115 generates a rule for a device 125 upon receiving information associated with a device event from the device manager 110. Examples of a device event may include a virtual device being added to the system 105, a physical device being added to the system 105, etc. In an alternate embodiment, the rule manipulation module 115 can access the devices of the system 105, such as devices 125, and therefore can obtain information associated with the device event directly. In one embodiment, the device event occurs in the system 105 in response to the addition of a physical device 125 to the system 105. In an alternate embodiment, the device event occurs in the system 105 in response to the addition of a virtual device to the system 105. In another alternate embodiment, the device event occurs in the system 105 in response to a user input of a future addition of a physical device or virtual device to the system 105. In yet another alternate embodiment, the device event occurs in the system 105 in response another event generated by the state of the system. In an additional alternate embodiment, the device event occurs in the system 105 as the result of a calculation. The information associated with the device event can include a type of the device 125 that caused the device event to occur. In some embodiments, the information associated with the device event can also include a unique identifier of the device 125 that caused the device event to occur, a size of the device 125 that caused the device event to occur, a manufacturer of the device 125 that caused the device event to occur, etc.

In response to receiving information associated with the device event, the rule manipulation module 115 can generate a rule for the device 125 that caused the device event to occur based on the information associated with the device event and a state of the system 105. In one embodiment, the state of system 105 includes all devices 125 currently associated with the system 105 and any system requirements for the devices 125. The rule for the device 125 that caused the device event to occur can include the identifier for the device 125 that caused the device event to occur and an action to perform using the device 105 that caused the device event to occur.

The rule manipulation module 115 can write the rule to data store 130 using the file system 120. The rule manipulation module 115 can send a request to the file system 120 to open an object to store the rule. In one embodiment, the object to store the rule is a file. In one embodiment, the rule manipulation module 115 sends the rule to the file system 120. In response to the request to open an object, the file system 120 can open an object for the rule. If the file system 120 also received the rule from the rule manipulation module 115, the file system 120 can write the rule to the object. If the file system 120 did not receive the rule from the rule manipulation module 115, the file system 120 does not write to the object. The rule manipulation module 115 can send a request to the file system 120 to save the object to the data store 130 once the rule has been written to the object. In response to the request to save the object, the file system 120 can save the object for the rule. For example, a rule for a newly added disk X can associate disk X with virtual machine A, and include an action that disk X be accessible to (or used by) virtual machine A.

The rule manipulation module 115 can generate an updated state of the system 105 based on the rule. The rule manipulation module 115 can generate the updated state of the system 105 by applying the rule to the system 105. In one embodiment, the rule manipulation module 115 generates the updated state by applying the rule to the system 105 upon generating the rule. In an alternate embodiment, the rule manipulation module 115 generates the updated state of the system 100 by applying the rule to the system 105 upon receiving information about another device event, such as a device 125 for which the rule was generated being connected to the system 105. In another embodiment, the rule manipulation module 115 generates the updated state of the system 105 by applying the rule periodically (e.g., every hour, every day, etc.). In one embodiment, the rule manipulation module 115 applies the rule to the system 105 by providing the rule generated for a device 125 to the device manager 110. In an alternate embodiment, the rule manipulation module 115 applies the rule to the system 105 by providing an identifier of the rule, such as an address or location for the rule in data store 130, to the device manager 110.

The device manager 110 can perform any actions specified in the provided rule using the device 125 for which the rule was generated. If an additional device 125 is included in the rule, the device manager 110 can perform the actions specified in the rule on the additional device 125. For example, if a rule for a virtual storage media A includes a requirement that the permissions for the virtual storage media A be updated and a hardware disk be used for virtual storage media A, the device manager 110 will change the permissions for virtual storage media A and assign a hardware disk for the virtual storage media A.

The rule manipulation module 115 can determine whether an additional rule (second rule) is required for the updated state of the system 105 by determining whether the rule generated for the device satisfies the requirements included in the updated system state. For example, the permissions for virtual storage media A are changed and a disk is assigned for the virtual storage media A to generate the updated state. In this example, if there is a requirement for a disk to only be assigned to a singe virtual storage media, a rule will be generated for the disk assigned to virtual storage media A rule to not allow it to be assigned to another virtual storage media once the rule for virtual storage media A is applied. Alternately, the updated system state can reflect that the disk for the virtual storage media A (application of the rule) was assigned. However, the assigned disk does not satisfy the requirement of a disk only being assigned to a single virtual storage media because the disk is already assigned to another virtual storage media. In this case, another rule will be generated for the virtual storage media A assigning a different disk. If the rule manipulation module 115 determines that an additional rule is required for the updated state of the system 105, the rule manipulation module 115 can generate the additional rule and apply the additional rule.

Figure 2:
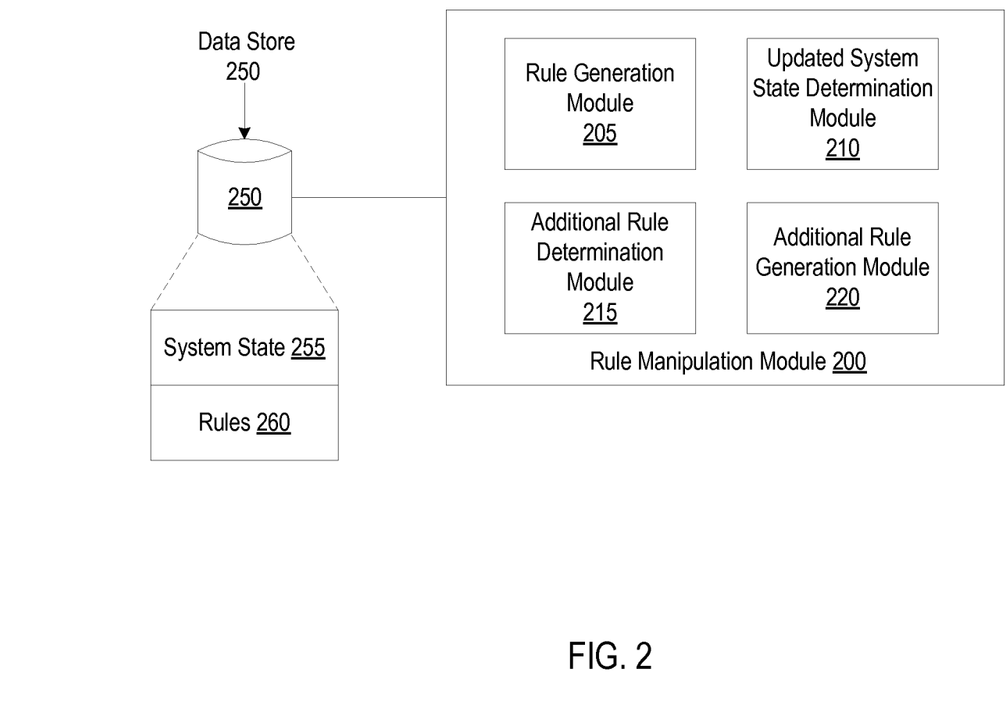
FIG. 2 is a block diagram of a rule manipulation module, in accordance with an embodiment.

FIG. 2 is a block diagram of a rule manipulation module 200, in accordance with one embodiment of the present disclosure. The rule manipulation module 200 includes a rule generation module 205, an updated system state determination module 210, an additional rule determination module 215, and an additional rule generation module 220. Note that in alternative embodiments, the functionality of one or more of the rule generation module 205, the updated system state determination module 210, the additional rule determination module 215, and the additional rule generation module 220 may be combined or divided.

The rule generation module 205 can generate a rule for a device upon receiving information associated with a device event. The rule generation module 205 can generate the rule based on the information associated with the device event and a system state. The rule generation module 205 can access the system state by accessing a data store, such as system state 255 of data store 250. The rule generation module 205 can generate a rule for the device by obtaining a unique identifier for the device, determining another device from the system state, determining one or more requirements for the device based on the system state, and creating a rule associating the device and the unique identifier for the device with the another device based on the requirements for the device. The rule generation module 205 can generate a rule that includes the unique identifier for the device, the association of the device and the other device, and an action to take upon connection of the device with the unique identifier or upon connection of another device with the same type (e.g., class) as the device. If there is no system state accessible or relevant to the rule generation module 205, the rule generation module 205 can generate the rule for the device based only on the information associated with the device event. Upon generating the rule, the rule generation module 205 can save the rule in storage, such as rules 260 of data store 250.

The updated system state determination module 210 can determine an updated system state based on the rule generated by the rule generation module 205. In one embodiment, the updated system state determination module 210 determines an updated system state based on the rule generated by the rule generation module 205 by including the device or devices (e.g., type of the device, unique identifier of the device, etc.) associated with the rule generated by the rule generation module 205 in the system state and applying the rule generated by the rule generation module 205. In one embodiment, the updated system state determination module 210 can save the updated system state in storage, such as system state 255 of data store 250.

The additional rule determination module 215 can determine whether an additional rule is required based on the updated system state. The additional rule determination module 215 can determine whether an additional rule is required based on the updated system state by determining whether the rule generated by the rule generation module 205 satisfies one or more requirements included in the updated system state. If the rule generated by the rule generation module 205 satisfies each system requirement in the updated system state, the additional rule determination module 215 can determine that an additional rule is not required based on the updated system state. If the rule generated by the rule generation module 205 does not satisfy each system requirement in the updated system state, the additional rule determination module 215 can determine that an additional rule is required based on the updated system state. The additional rule determination module 215 can notify the additional rule generation module 220 if the updated system state requires an additional rule.

The additional rule generation module 220 can generate an additional rule upon receiving a notification from the additional rule determination module 215. To generate the additional rule for the device, the additional rule generation module 220 can analyze the updated system state to determine one or more requirements for the device based on the updated system state and create a rule based on the one or more requirements. The additional rule generation module 220 can determine one or more requirements for the device based on the updated system state and associate the device with another device based on the one or more requirements. The additional rule generation module 220 can include a unique identifier for the device, a unique identifier for the other device, and an action to perform using the devices in the additional rule. The additional rule generation module 220 can save the additional rule in storage, such as rules 260 of data store 250.

Figure 3:
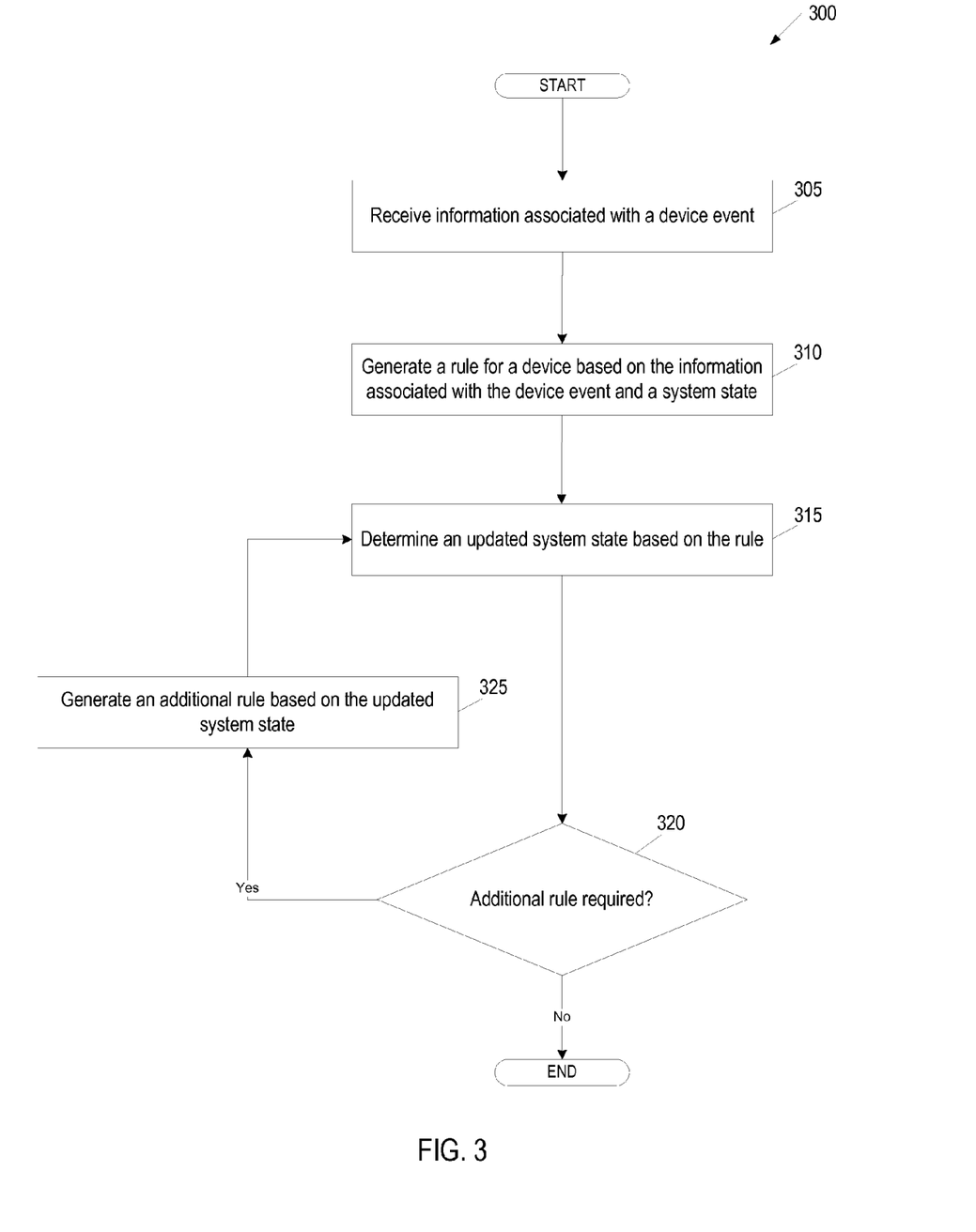
FIG. 3 is a flow diagram illustrating an embodiment for a method of dynamically manipulating rules for adding new devices, in accordance with an embodiment.

FIG. 3 is a flow diagram of an embodiment of a method 300 for method of dynamically manipulating rules for adding new devices. The method 300 is performed by processing logic that may comprise hardware (circuitry, dedicated logic, etc.), software (such as is run on a general purpose computer system or a dedicated machine), or a combination of both. In one embodiment, the method 300 is performed by the rule manipulation module 200 of FIG. 2.

At block 305, processing logic receives information associated with a device event. In one embodiment, the device event occurs in response to an addition of a physical device to a computing system or removal of a physical device from the computing system, such as the addition or removal of a disk of the computing system, the insertion or removal of a Universal Serial Bus (USB) connector into the computing system to form or break a connection between the computing system and a physical device, etc. In an alternate embodiment, the device event occurs in response to an addition of a virtual device to a computing system or removal of a virtual device from the computing system, such as the creation of a virtual machine, the addition of a virtual memory, the removal of a virtual machine, the removal of a virtual memory, etc. In another alternate embodiment, the device event occurs in response to a user input of a future addition or removal of a physical device (e.g., hardware) or a virtual device. For example, an administrator or a user of a computing system can input that storage, such as a disk, will be added to the computing system at a later date. In another example, an administrator or a user of a computing system can input that a virtual machine will be created on the computing system at a later date. The information associated with the device event can include a type of device affected by the device event (e.g., a physical disk, a virtual memory, etc.). In one embodiment, the information associated with the device event includes a unique identifier for the device that triggered the device event. In some embodiments, the information associated with the device event also includes other information about the device, such as a size of the device, a manufacturer of the device, an address space for the device, etc.

At block 310, processing logic generates a rule for a device based on the information associated with the device event and a system state. In one embodiment, the system state includes the virtual devices and physical devices currently associated with the computing system and system requirements for the virtual devices and physical devices. For example, the system state can include all virtual disks and physical disks currently available to the computing system, all virtual memory and physical memory available to the computing system, the virtual machines running on the computing system, etc. In some embodiments, the system state can include other information, such as screen brightness, network connections, etc. Processing logic can obtain the system state from the computing system, such as from a subsystem of the computing system that manages the hardware devices. For example, processing logic can obtain the system state from a device manager of the computing system (e.g., UDEV®), a kernel running on the computing system (e.g., Linux® kernel), an operating system running on the computing system (e.g., Linux® operating system, Windows® operating system, etc.), etc.

In one embodiment, to generate the rule for the device, processing logic obtains a unique identifier for the device, determines one or more requirements for the device based on the system state, and creates a rule for the device identified by the unique identifier based on the one or more requirements. In an alternate embodiment, to generate the rule for the device, processing logic obtains a unique identifier for the device, determines other devices (virtual or physical) in the computing system from the system state, determines one or more requirements for the device based on the system state, and creates a rule associating the device identified by the unique identifier with at least one other device based on the one or more requirements for the device. The rule can further include an action to take when the device (identified by the unique identifier) is connected to the computing system. For example, a rule for a newly added disk X can associate disk X with virtual machine A, and include an action that disk X be accessible to (or used by) virtual machine A.

The unique identifier for the device can be an identifier that is only associated with the particular device, such as a name of the device, a serial number of the device, etc. In one embodiment, the device event includes a unique identifier for the device, and processing logic obtains the unique identifier for the device from the device event. In an alternate embodiment, processing logic obtains the unique identifier for the device by requesting the unique identifier from the device. In another alternate embodiment, processing logic obtains the unique identifier for the device by requesting the unique identifier from a kernel running on the computing system. In one embodiment, if the device is not currently available to the computing system (e.g., not plugged in), processing logic waits until the device is available to obtain the unique identifier and generate the rule. In an alternate embodiment, if the device is not currently available to the computing system (e.g., not plugged in), processing logic assigns an identifier to the device based on the type of the device, thereby creating a general rule for all devices of the same type as the device that is currently not available. In another embodiment, if the device is not currently available to the computing system (e.g., not plugged in), processing logic does not obtain a unique identifier for the device and creates a general rule for the computing system.

In one embodiment, processing logic analyzes the system state to determine one or more requirements for the device. The one or more requirements can be based on the unique identifier of the device, the size of the device, the type of the device, other devices that are in the system, etc. In some embodiments, the requirements are included in the system state. If a requirement only includes the device for which the rule is being generated (and no other additional devices) or the system state does not have a device (other than the device for which the rule is being generated) that satisfies the requirement, processing logic can create an action to perform using the device identified by the unique identifier based on the one or more requirements. For example, if the device event was for a virtual disk A and the system state includes a requirement that virtual disks have an address space of 100 MB but does not have a disk currently available that has 100 MB available, the rule generated for virtual disk A will include the identifier "virtual disk A" and an action to create an address space for virtual disk A that is 100 MB. If a requirement includes an additional device (other than the device for which the rule is being generated) or the requirement requires an additional device to satisfy the requirement, processing logic associates the device and the unique identifier for the device with the additional device by including the unique identifier for the device and an identifier for the additional device in the rule, and creating an action to perform using the devices based on the one or more requirements. For example, if the device event was for a virtual disk A and the system state includes a requirement that virtual disks have an address space of 100 MB and the system state includes a physical disk B, the rule generated for virtual disk A will include the identifier "virtual disk A" and an action to allocate 100 MB of address space to virtual disk A from disk B. In one embodiment, the action is performed when the rule is accessed, such as when the device with the unique identifier is connected to the computing system. The rule can be written in a format that can be read and understood by a device manager (e.g., UDEV®).

For example, if the information associated with the device event includes a new disk added, and the system state includes a virtual machine A on the computing system, processing logic obtains a unique identifier for the new disk added, such as X, and creates a rule for disk X with an action to change the permissions of new disk X to permit the virtual machine A to use the new disk X. In another example, the information associated with the device event includes a 1 terabyte (TB) disk and the system state includes virtual machines A and B and a requirement to use the same disk for multiple virtual machines. In this example, processing logic obtains a unique identifier for the disk, X, and create a rule for disk X with an action to change the permission of the disk X to permit both virtual machine A and B to access disk X. In another example, the information associated with the device event includes a new virtual machine and the system state includes a hard disk. In this example, processing logic creates a unique identifier for the virtual machine, such as Y, and creates a rule for virtual machine Y with an action to use the hard disk if the hard disk has a predefined amount of free storage space and to create a file disk if the hard disk does not have a predefined amount of free storage space. In yet another example, the device event includes two network cards and the system state includes a requirement for high network throughput. In this example, processing logic obtains a unique identifier for each network card, such as the serial number for each of the network cards, and creates a rule for the network cards with the specific serial numbers with an action to create a bond device on top of the network cards. Once the rule is generated and applied, the bond device can be created and provided to a virtual machine such that the virtual machine can use both network cards and therefore have a high network throughput.

In some embodiments, once the rule is generated, processing logic can write the rule to an object (e.g., file). In one embodiment, processing logic can write the rule to a object using a file system to open the object and save the object. In some embodiments, processing logic can provide the rule to a device manager (UDEV®, etc.). In one such embodiment, processing logic can provide the rule to the device manager upon generating the rule. In an alternate embodiment, processing logic can provide the rule to the device manager upon the occurrence of a predefined event, such as the hardware device matching the identifier in the rule being connected to the computing system. In another alternate embodiment, processing logic can provide rules to the device manager periodically (e.g., once a day, etc.).

In some embodiments, once the hardware device is removed from the computing system, the rule for the hardware device can be deleted from the computing system.

At block 315, processing logic determines an updated system state based on the rule generated for the device. In one embodiment, processing logic determines an updated system state based on the rule by including the device (e.g., type of the device, unique identifier of the device, etc.) in the system state and applying the rule for the device. In one embodiment, processing logic applies the rule for the hardware device to the computing system upon creating the rule. In an alternate embodiment, processing logic applies the rule for the hardware device to the computing system upon the occurrence of a predefined event (e.g., a predetermined amount of time after the rule is created, detection of an additional device event, etc.). In one embodiment, processing logic applies the rule generated for the device to the computing system by running the rule on a computing system. In an alternate embodiment, processing logic applies the rule created for the device to the computing system by injecting the rule into a device manager and triggering the device manager to run using the rule.

In an alternate embodiment, processing logic determines an updated system state based on the rule by including the device (e.g., type of the device, unique identifier of the device, etc.) and any system requirements for the device in the system state, such that the system state includes the device for which the rule was created, any requirements for the device, as well as the virtual devices and physical devices currently associated with the computing system, and the system requirements for the virtual devices and the physical devices. The requirements for the device can include any requirements defined in the rule created for the device, such as a predefined amount of free storage space, a number of network cards, etc. The requirements for the device can also include any requirements associated with the type of the device, such as a disk being exclusively used for one computing system. In one embodiment, the requirements defined in the rule created for the specific device can have a higher priority or precedence than the requirements associated with the type of the device. In this embodiment, if a requirement defined in the rule created for the device contradicts or invalidates a requirement associated with the type of the device, the requirement defined in the rule created for the device is used to update the system state. For example, if a requirement defined in the rule created for the device assigns virtual machine A to use disk X, and the system state includes virtual machines A and B and a requirement to use the same disk for multiple virtual machines, the system state will be updated to include that virtual machine A as the only virtual machine using disk X. In an alternate embodiment, the requirements defined in the rule created for the specific device can have a lower priority or precedence than the requirements associated with the type of the device. In this embodiment, if a requirement defined in the rule created for the device contradicts or invalidates a requirement associated with the type of the device, the requirement associated with the type of the device is used to update the system state. For example, if a requirement defined in the rule created for the device assigns virtual machine A to disk X, and the system state includes virtual machines A and B and a requirement to use the same disk for multiple virtual machines, the system state will be updated to include that virtual machines A and B use disk X.

At block 320, processing logic determines whether an additional rule is required based on the updated system state. Processing logic can determine whether an additional rule is required based on the updated system state by determining whether the rule generated for the device satisfies the requirements included in the updated system state. Processing logic can determine whether the rule generated for the device satisfies the requirements included in the updated system state by applying the rules in the system and evaluating the updated system state.

In some embodiments, processing logic determines that an additional rule is required based on the updated system state when the rule generated for the device implicitly includes an action that requires an additional rule. For example, if the rule generated for the device includes an action to generate a new device event, then the updated system state requires an additional rule to be generated because of the new device event.

In some embodiments, processing logic determines that an additional rule is required based on the updated system state when the rule generated for the device does not satisfy the requirement for which it was generated or when the rule generated for the device does not satisfy another requirement based on the application of the rule. For example, a rule changes the permissions for virtual storage media A and assigns a disk for virtual storage media A to generate the updated system state, and the updated system state includes a requirement for a disk to only be assigned to a singe virtual storage media. In this example, if the disk assigned to virtual storage media A is already assigned to another virtual storage media, the rule generated for virtual storage media A will not satisfy the requirements included in the updated system state based on the application of the rule.

In some embodiments, processing logic determines that an additional rule is required based on the updated system state when the rule generated for the device satisfies the requirement and requires another rule because the requirement was satisfied. For example, a rule changes the permissions for virtual storage media A, assigns a disk for virtual storage media A to generate the updated state, and the updated system state includes a requirement that only one virtual storage media is to be assigned to a disk. In this example, if the disk assigned to virtual storage media A is only assigned to virtual storage media A, another rule is required for the disk to ensure that another virtual storage media is not assigned to it.

In some embodiments, processing logic determines that an additional rule is required based on the updated system state when an additional requirement is included in the updated system state that was not previously in the system state.

If processing logic determines that an additional rule is not required, the method 300 ends. If processing logic determines that an additional rule is required, the method 300 proceeds to block 325.

At block 325, processing logic generates an additional rule based on the updated system state. To generate the additional rule, processing logic can analyze the updated system state to determine one or more requirements for the device based on the updated system state and create a rule based on the one or more requirements.

If the updated system state includes the rule previously generated for the device implicitly with an action that requires an additional rule, processing logic can create the rule based on the action. For example, if the rule generated for the device includes an action to generate a new device event, then the updated system state includes the new device event, and the additional rule is generated based on the new device event.

If the updated system state includes a rule generated for the device that does not satisfy the requirement for which it was generated or does not satisfy another requirement based on the application of the rule, processing logic can create the rule based on the requirement that is not satisfied. For example, a rule changes the permissions for virtual storage media A and assigns a disk for virtual storage media A to generate the updated system state, and the updated system state includes a requirement for a disk to only be assigned to a singe virtual storage media. In this example, if the disk assigned to virtual storage media A is already assigned to another virtual storage media, the rule generated for virtual storage media A will not satisfy the requirements included in the updated system state based on the application of the rule and an additional rule is created assigning a different disk to the virtual storage media A.

If the updated system state includes a rule generated for the device that satisfies the requirement and requires another rule because the requirement was satisfied, processing logic can create the rule based on the requirement that is satisfied. For example, a rule changes the permissions for virtual storage media A, assigns a disk for virtual storage media A to generate the updated state, and the updated system state includes a requirement that only one virtual storage media is to be assigned to a disk. In this example, if the disk assigned to virtual storage media A is only assigned to virtual storage media A, another rule is created for the disk to ensure that another virtual storage media is not assigned to it.

If the updated system state includes an additional requirement, processing logic can create the rule based on the additional requirement. If the additional requirement only includes the device for which the additional rule is being generated (and no other additional devices) or the updated system state does not have a device that satisfies the additional requirement (other than the device for which the additional rule is being generated), processing logic can create an action to perform using the device identified by the unique identifier based on the additional requirement. If the additional requirement includes an additional device (other than the device for which the additional rule is being generated) or the requirement requires an additional device to satisfy the additional requirement, processing logic associates the device and the unique identifier for the device with the additional device by including the unique identifier for the device and an identifier for the additional device in the rule, and creating an action to perform using the devices based on the additional requirement.

The additional rule can be written in a format that can be read and understood by a device manager (e.g., UDEV®). In one embodiment, the action is performed when the rule is accessed, such as when the hardware device with the unique identifier is connected to the computing system. Upon generating the additional rule for the device based on the updated system state, the method 300 can apply the rule and can return to block 315 to determine an updated system state based on the additional rule.

Figure 4:
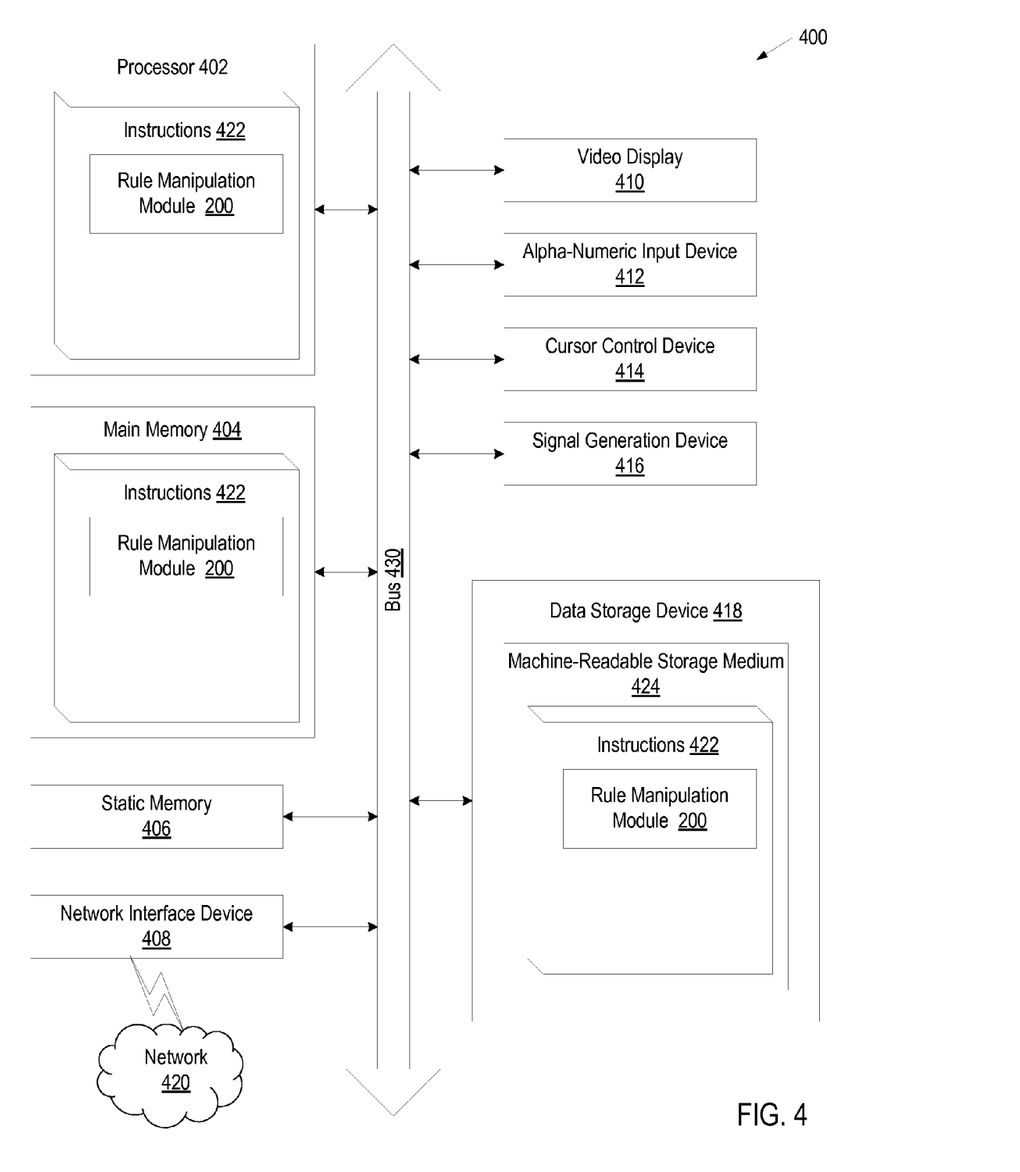
FIG. 4 is a block diagram of an exemplary computer system that may perform one or more of the operations described herein.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 424 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for a rule manipulation module 200, and/or a software library containing methods that dynamically manipulate rules for adding new devices. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating," "analyzing," "determining," "computing," "identifying," "modifying," "triggering," "injecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    determining, by a processing device of a computing system, that a first device is being added to the computing system;
    determining a system requirement for the first device from a system state of the computing system;
    generating, by the processing device, a rule for the first device in view of the first device being added to the computing system and the system requirement specified by the system state of the computing system;
    determining, from the system state, that the system requirement is to be satisfied using a second device of the computing system and the first device being added to the computing system; and
    specifying, by the processing device, an action in the rule to perform using the first device being added to the computing system and the second device to satisfy the system requirement specified by the system state, wherein the action changes the system state of the computing system.

2. The method of claim 1, further comprising:
    determining an updated system state of the computing system in view of the rule for the first device;
    determining whether to generate a second rule in view of the updated system state; and
    generating the second rule in view of the updated system state indicating to generate the second rule.

3. The method of claim 2, wherein determining whether to generate the second rule in view of the updated system state comprises:
- determining whether performing the action specified in the rule for the first device satisfies the system requirement;
- determining to generate the second rule responsive to determining that performing the action does not satisfy the system requirement; and
- determining to not generate the second rule responsive to determining that performing the action satisfies the system requirement.

4. The method of claim 1, wherein the rule comprises a unique identifier for the first device and an association of the first device and the second device.

5. The method of claim 1, wherein the rule for the first device comprises a unique identifier for the first device, and the action is to be performed upon the first device with the unique identifier.

6. A non-transitory computer readable storage medium having instructions that, when executed by a processing device, cause the processing device to:
- determine, by the processing device, that a first device is being added to the computing system;
- determine a system requirement for the first device from a system state of the computing system;
- generate, by the processing device, a rule for the first device in view of the first device being added to the computing system and the system requirement specified by the system state of the computing system;
- determine, from the system state, that the system requirement is to be satisfied using a second device of the computing system and the first device being added to the computing system; and
- specify, by the processing device, an action in the rule to perform using the first device being added to the computing system and the second device to satisfy the system requirement specified by the system state, wherein the action changes the system state of the computing system.

7. The non-transitory computer readable storage medium of claim 6, wherein the processing device is further to:
- determine an updated system state of the computing system in view of the rule for the first device;
- determine whether to generate a second rule in view of the updated system state; and
- generate the second rule in view of the updated system state indicating to generate the second rule.

8. The non-transitory computer readable storage medium of claim 7, wherein to determine whether to generate the second rule in view of the updated system state, the processing device is to:
- determine whether performance of the action specified in the rule for the first device satisfies the system requirement;
- determine to generate the second rule responsive to a determination that performance of the action does not satisfy the system requirement; and
- determine to not generate the second rule responsive to a determination that performance of the action satisfies the system requirement.

9. The non-transitory computer readable storage medium of claim 6, wherein
the rule comprises a unique identifier for the first device and an association of the first device with the second device.

10. The non-transitory computer readable storage medium of claim 6, wherein the rule comprises a unique identifier for the first device, and the action is to be performed upon the first device with the unique identifier.

11. A computing system comprising:
a memory; and
a processing device, operatively coupled to the memory, to:
- determine that a first device is being added to the computing system;
- determine a system requirement for the first device from a system state of the computing system;
- generate a rule for the first device in view of the first device being added to the computing system and the system requirement specified by the system state of the computing system;
- determine, from the system state, that the system requirement is to be satisfied using a second device of the computing system and the first device being added to the computing system; and
- specify an action in the rule to perform using the first device being added to the computing system and the second device to satisfy the system requirement specified by the system state, wherein the action changes the system state of the computing system.

12. The computing system of claim 11, wherein the processing device is further to:
- determine an updated system state of the computing system in view of the rule for the first device;
- determine whether to generate a second rule in view of the updated system state; and
- generate the second rule in view of the updated system state indicating to generate the second rule.

13. The computing system of claim 12, wherein to determine whether to generate the second rule in view of the updated system state, the processing device is to:
- determine whether performance of the action specified in the first rule for the first device satisfies the system requirement;
- determine to generate the second rule responsive to a determination that performance of the action does not satisfy the system requirement; and
- determine to not generate the second rule responsive to a determination that performance of the action satisfies the system requirement.

14. The computing system of claim 11, wherein
the rule comprises a unique identifier for the first device and an association of the first device with the second device.

15. The computing system of claim 11, wherein the rule comprises a unique identifier for the first device, and the action is to be performed upon the first device with the unique identifier.

* * * * *